(12) United States Patent
Attar et al.

(10) Patent No.: US 11,274,461 B2
(45) Date of Patent: *Mar. 15, 2022

(54) DIRECTIONAL CONTROL OF ROBOTIC POOL CLEANERS

(71) Applicant: Aquatron Robotic Technology Ltd., Afula (IL)

(72) Inventors: Benjamin Attar, Kiryat Bialik (IL); Shahar Schloss, Haifa (IL)

(73) Assignee: Aquatron Robotic Technology Ltd., Afula (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,929

(22) Filed: Oct. 30, 2019

(65) Prior Publication Data

US 2020/0063454 A1 Feb. 27, 2020

Related U.S. Application Data

(63) Continuation of application No. 15/823,596, filed on Nov. 28, 2017, now Pat. No. 10,494,827.

(51) Int. Cl.
*E04H 4/16* (2006.01)
*G05D 1/02* (2020.01)
*G05D 1/00* (2006.01)

(52) U.S. Cl.
CPC ......... *E04H 4/1654* (2013.01); *G05D 1/0016* (2013.01); *G05D 1/0033* (2013.01); *G05D 1/0206* (2013.01); *E04H 4/16* (2013.01); *G05D 1/0088* (2013.01); *G05D 2201/0215* (2013.01)

(58) Field of Classification Search
CPC ........ E04H 4/16; E04H 4/1636; E04H 4/1664
See application file for complete search history.

(56) References Cited

U.S. PATENT DOCUMENTS

| 5,056,612 | A | 10/1991 | Raumagnac |
| 5,351,355 | A | 10/1994 | Chiniara |
| 7,878,835 | B2 | 2/2011 | Fan |
| 8,771,504 | B2 | 7/2014 | Mastio et al. |
| 9,487,963 | B2 * | 11/2016 | Michelon ............ E04H 4/1654 |
| 10,167,650 | B2 * | 1/2019 | Torem .................. E04H 4/1654 |

(Continued)

FOREIGN PATENT DOCUMENTS

| FR | 2870281 | 5/2014 |
| WO | WO 95/02103 | 1/1995 |

OTHER PUBLICATIONS

Office Action for U.S. Appl. No. 15/823,596, dated May 13, 2019.
Partial European Search Report for EP Application No. 18207844.4, dated Dec. 12, 2019.

*Primary Examiner* — Michael D Jennings
(74) *Attorney, Agent, or Firm* — Pearl Cohen Zedek Latzer Baratz LLP (57) ABSTRACT

A robotic pool cleaner including: a housing; a propulsion mechanism configured to propel the robotic pool cleaner along an interior surface of a pool and a suction mechanism to draw liquid from the pool into the housing. A cable extends outward from the housing and a pull sensor is configured to generate a signal indicative of at least a direction in which the cable is pulled. A controller is configured to receive the signal and to operate the propulsion mechanism to propel the robot in accordance with the received signal.

18 Claims, 3 Drawing Sheets

(56) References Cited

U.S. PATENT DOCUMENTS

| | | | |
|---|---|---|---|
| 2007/0094817 A1* | 5/2007 | Stoltz | E04H 4/1636 15/1.7 |
| 2009/0064403 A1* | 3/2009 | Wolfe | G08B 21/082 4/504 |
| 2014/0015959 A1* | 1/2014 | Durvasula | G05D 1/0246 348/114 |

* cited by examiner

Fig. 5

DIRECTIONAL CONTROL OF ROBOTIC POOL CLEANERS

CROSS-REFERENCE TO RELATED APPLICATIONS

This application is a continuation of U.S. patent application Ser. No. 15/823,596, filed Nov. 28, 2017, which is hereby incorporated by reference.

FIELD OF THE INVENTION

The present invention relates to robotic pool cleaners. More particularly, the present invention relates to the directional control of robotic pool cleaners.

BACKGROUND OF THE INVENTION

Robotic pool cleaners are known to provide a practical solution for cleaning swimming pools and other types of tanks and pools. For example, the robotic cleaner may be placed in the pool when the pool is not in use. The robotic pool cleaner may then function autonomously to clean interior surfaces, such as the walls and floor, of the pool.

Such robotic pool cleaners typically are configured to self propel across interior surfaces (walls or floor) of the pool. A propulsion mechanism typically includes an electrically powered motor. This motor, or a different motor, may also power a suction mechanism that draws water and any suspended debris into an internal filter that traps the debris.

Typically, electrical power for operating the motor of the robotic pool cleaner is provided by a power supply that is located outside of the pool, e.g., at a safe distance from the edge of the pool. The power supply is connected to the robotic pool cleaner by a cable, which is normally configured to be buoyant and float on the surface of the water.

SUMMARY OF THE INVENTION

There is thus provided, in accordance with an embodiment of the present invention, a robotic pool cleaner including: a housing; a propulsion mechanism configured to propel the robotic pool cleaner along an interior surface of a pool; a suction mechanism to draw liquid from the pool into the housing; a cable that extends outward from the housing; a pull sensor configured to generate a signal indicative of at least a direction in which the cable is pulled; and a controller configured to receive the signal and to operate the propulsion mechanism to propel the robot in accordance with the received signal.

Furthermore, in accordance with an embodiment of the present invention, the pull sensor includes a bendable component to which the cable is attached and a bending sensor, wherein the generated signal is indicative of bending of the bendable component relative to the housing.

Furthermore, in accordance with an embodiment of the present invention, the bendable component includes a sleeve through which the cable is configured to pass from outside of the housing to an interior of the housing.

Furthermore, in accordance with an embodiment of the present invention, the pull sensor includes a proximity sensor for sensing proximity of a side of the bendable component to the housing.

Furthermore, in accordance with an embodiment of the present invention, the proximity sensor includes at least one magnetic sensor that is configured to measure a magnetic field that is indicative of proximity of one or a plurality of magnets to the sensor.

Furthermore, in accordance with an embodiment of the present invention, the one or a plurality of magnets are mounted on the bendable component, and the one or a plurality of magnetic sensors are mounted to the housing.

Furthermore, in accordance with an embodiment of the present invention, the pull sensor includes an accelerometer or a tilt sensor.

Furthermore, in accordance with an embodiment of the present invention, the controller is configured to operate the propulsion mechanism to propel the robotic pool cleaner toward the direction from which cable was pulled if the bendable component is bent from an unbent orientation by an angle that exceeds a threshold bending angle.

Furthermore, in accordance with an embodiment of the present invention, the controller is configured to operate the propulsion to propel the robotic pool cleaner toward the direction from which cable is pulled.

Furthermore, in accordance with an embodiment of the present invention, the controller is configured to operate the propulsion mechanism to reverse a direction of travel of the robotic pool cleaner when the direction from which the cable is pulled is substantially opposite a current direction of travel of the robotic pool cleaner.

Furthermore, in accordance with an embodiment of the present invention, the pull sensor includes a motion sensor configured to detect a deviation from a predetermined motion of the robotic pool cleaner.

Furthermore, in accordance with an embodiment of the present invention, the controller is configured to cause the robotic pool cleaner to begin traveling when the signal is received from the pull sensor when the robotic pool cleaner is standing stationary in a standby mode.

Furthermore, in accordance with an embodiment of the present invention, the traveling includes traveling to a wall of the pool.

Furthermore, in accordance with an embodiment of the present invention, the traveling further includes traveling up the wall to a waterline.

Furthermore, in accordance with an embodiment of the present invention, the controller is further configured to control the propulsion mechanism and the suction mechanism to cause the robotic pool cleaner to remain at the waterline after traveling up the wall to the waterline.

Furthermore, in accordance with an embodiment of the present invention, the cable includes a power cable.

Furthermore, in accordance with an embodiment of the present invention, the cable includes a float.

There is further provided, in accordance with an embodiment of the present invention, a robotic pool cleaner including: a housing; a propulsion mechanism configured to propel the robotic pool cleaner along an interior surface of a pool; a suction mechanism for drawing liquid from the pool into the housing; a motion sensor that is configured to generate a signal indicative of movement of the robotic pool cleaner; and a controller configured to: control the propulsion mechanism to cause the robotic pool cleaner to stand stationary in a standby mode upon completion of a cleaning cycle; receive the signal from the motion sensor; and when the received signal is indicative of motion of the robotic pool cleaner while in the standby mode, operate the propulsion mechanism to propel the robotic pool cleaner to a wall of the pool and to climb the wall to a waterline of the pool.

Furthermore, in accordance with an embodiment of the present invention, the controller is further configured to control the propulsion mechanism and the suction mechanism to cause the robotic pool cleaner to remain at the waterline after climbing the wall to the waterline.

Furthermore, in accordance with an embodiment of the present invention, the robotic pool cleaner includes a cable that extends outward from the housing and a pull sensor configured to generate a pull signal indicative of at least a direction in which the cable is pulled, wherein the controller is further configured to receive the pull signal and to operate the propulsion mechanism to propel the robot to a wall of the pool and to climb the wall to the waterline when the pull signal is received while the robotic pool cleaner is in the standby mode.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a robotic pool cleaner is configured to operate autonomously to clean a pool. A propulsion system of the robotic pool cleaner may be configured to propel the robotic pool cleaner across a pool surface, such as an interior wall or a floor of the pool, in accordance with predetermined and programmed instructions. For example, the programmed instructions may be configured such that, at least under some conditions, the robotic pool cleaner will reach all parts of the pool surfaces that are to be cleaned.

A pool that the robotic pool cleaner is configured to clean may include a water-filled swimming pool. Alternatively or in addition, a robotic pool cleaner may be configured to clean another type of liquid filled container (e.g., artificial pond, fish tank, industrial vat, storage tank, or other container that may be filled with water or another liquid). Therefore, any reference herein to a pool, water, or to similar or related terms should be understood as including any suitable type of liquid container (e.g., that is large enough to enable or merit cleaning by a robotic pool cleaner) or suitable type of liquid (e.g., a liquid that is not too corrosive, viscous, or lubricating so as to interfere with operation of the robotic pool cleaner), respectively.

The robotic pool cleaner is configured such that an operator is enabled to remotely control at least some aspects of operation of the robotic pool cleaner. In particular, the robotic pool cleaner may be configured to enable at least limited remote control of propulsion of the robotic pool cleaner, e.g., during operation of the robotic pool cleaner. For example, the operator may change a direction of motion of the robotic pool cleaner along a pool surface. The operator may remotely control the operation of the robotic pool cleaner when standing outside of the pool. Thus, the operator may override autonomous operation of the robotic pool cleaner, e.g., when autonomous operation does not, or cannot, address a particular situation (e.g., shape of pool for which programming of the robotic pool cleaner is not optimized, expediting cleaning of debris at a particular location in the pool, causing the robotic pool cleaner to approach a part of the pool to facilitate removal of the robotic pool cleaner from the pool, or another situation where an operator may intervene with autonomous operation of the robotic pool cleaner).

The robotic pool cleaner may be remotely controlled by pulling a control cable that extends outward from the robotic pool cleaner, from a housing of the robotic pool cleaner. For example, the control cable may be identical with, or may include, a power cable of the robotic pool cleaner that connects the robotic pool cleaner to a remote power source (e.g., that is located outside of the pool). The power cable may be connected directly to a socket in the control unit or robot housing, may interface with a built-in cable that protrudes from the control unit or robot housing, or may be wired directly to the control unit or motor housing, e.g., via a waterproof gland. In some cases, another type of cable may function as the control cable (e.g., a dedicated control cable with no other function, a communications cable, or another type of cable).

For example, when the control cable is pulled in a particular direction, operation of the propulsion system of the robotic pool cleaner may change so as to propel the robotic pool cleaner in the direction of the pull.

In some cases, the control cable may be otherwise used to control operation of the robotic pool cleaner. For example, a controller or control unit (these terms being used herein interchangeably) of the robotic pool cleaner may be configured to recognize one or more sequences of pulls. Such sequences may be interpreted to indicate, for example, a power setting (e.g., on, off, rotation rate, or other setting) of a motor of the propulsion system or of a suction mechanism of the robotic pool cleaner.

The control cable may be connected to the robotic pool cleaner via a pull sensing mechanism that is configured to detect a direction or other property of a pulling force that is applied to the control cable. For example, the sensing mechanism may be configured to generate a signal that is indicative of one or more characteristics (e.g., direction, magnitude of force, duration of the force, or another characteristic) of the force that is applied to the control cable.

For example, the control cable may attach to a housing of the robotic pool via a bendable component (e.g., a rod, sleeve, or other bendable component) that is bendably connected to the housing of the robotic pool cleaner. The bendable connection of the bendable component to the robot housing may enable the bendable component to bend in response to a pull that is exerted on the control cable. In some cases, the bendable connection may be elastic or resilient so as to return the bendable component to an initial orientation when no pull is exerted on the control cable.

In some cases, the bendable component may include a sleeve through which the control cable enters the housing. The sleeve may include a hollow bore through which the control cable may pass from the exterior of the housing to the interior of the housing. For example, in the cases where the control cable includes a power cable, the control cable may enter the housing through the sleeve in order to connect to one or more internal components of the robotic pool cleaner. Such internal components may include, for example, a controller, motor, pump, sensor, lamp, or other internal component.

The sensing mechanism may thus include one or more sensors that are configured to detect bending of the bendable component. In one example, the bendable component may incorporate one or more magnets. The magnets may include one or more permanent magnets or electromagnets. For example, a permanent magnet may be in the form of a magnetized disk that is attached to and surrounds the bendable component, or in the form of plurality of magnets distributed around the perimeter of the bendable component Similarly, a plurality of electromagnets may be distributed around the perimeter of the bendable component. An array of Hall effect sensors may be rigidly mounted to the housing surrounding the flexible connection. In this case, bending of the bendable component may bring the permanent magnet into the vicinity of one or more of the Hall effect sensors. Thus, a signal may be generated that is indicative of a bending direction of the bendable component. In other examples, the positions of the permanent magnet and the Hall effect sensors may be interchanged. Other types of sensors for sensing a bend may be used (e.g., optical, capacitive, or acoustic proximity sensors, strain gauges or sensors, or other sensors capable of sensing a bending of the bendable component).

Alternatively or in addition, the sensing mechanism may include one or more force detectors that directly measure a force that is exerted on the control cable. For example, the force detectors may include contact switches, strain gauges, or sensors that generate a signal that is indicative of a compressive or tensile force that is exerted on the control cable or on a connection of the control cable to the robotic pool cleaner.

Alternatively or in addition, the sensing mechanism may include a motion sensor that senses a deviation of motion of the robotic pool cleaner from a predetermined path or motion. For example, the pull on the control cable may move, accelerate, or rotate the robotic pool cleaner. The motion sensors may sense a direction of translation or rotation of the robotic pool cleaner. For example, the motion sensors may include one or more inertial sensors, optical sensors (e.g., an optical mouse sensor, or other optical sensor), acoustic sensors (e.g., a Doppler sensor, microphonic sensor, or other acoustic sensor), flowmeters, electromagnetic sensors, or other sensors capable of measuring a motion or an acceleration of the robotic pool cleaner. Such sensors may be located at any appropriate location on the robotic pool cleaner, and not necessarily near a connection of the control cable to robot housing or to the robotic pool cleaner. The robotic pool cleaner may be configured, in response to the sensed movement or rotation, to alter its direction of travel, e.g., toward the direction of the translation or rotation.

Directional control by pulling of a control cable may enable simple and inexpensive remote control of the robotic pool cleaner. Conventional forms of remote control, such as infra-red optical pulses or radio waves, do not work reliably underwater or at a transition between air and water. Transmitting commands from a remote control unit to the power supply from which the commands are retransmitted over the power cable to the robotic pool cleaner may increase the cost and complexity of the robotic pool cleaner, e.g., by requiring cables that include extra wires for data transmission.

In some cases, the control cable connects to an upper section of the robotic pool cleaner. In other cases, the control cable may connect to another side of the robotic pool cleaner. As used herein, a side of the robotic pool cleaner is referred to as a top or upper side when that side faces upward when the robotic pool cleaner is standing upright on a horizontal floor of a pool (e.g., is oriented to enable cleaning of a floor of a pool) Similarly, a side of the robotic pool cleaner is referred to as a bottom or lower side when that side faces downward when the robotic pool cleaner is standing upright on a horizontal floor of a pool. A side that is referred to as a lateral side is a side that does not face either upward or downward (e.g., frontward, rearward, right, left, or another direction that is neither upward nor downward) when the robotic pool cleaner is standing upright on a horizontal floor of a pool.

In some cases, the control cable may include, incorporate, or connect to one or more floats. The floats may be configured to ensure that at least part of the control cable (which, as described above, may be identical to a power cable) floats at the water surface of the pool. Thus, the cable may be readily accessible by an operator of the robotic pool cleaner. The floats may also ensure that a section of the control cable that is adjacent to the robotic pool cleaner is substantially vertical. Therefore, a direction of a lateral pull that is exerted on the control cable may be unambiguously sensed by the sensing mechanism.

Operation of the propulsion and suction systems may be controlled by a control unit. The control unit may include one or more electronic circuits, e.g., including a microcontroller and control software preprogrammed in memory. The control unit is typically housed within a single watertight housing that also encloses a motor of the propulsion or suction system. For example, the control unit may be configured to control a speed, rotation direction, or other operating characteristic of a motor or pump of the propulsion system, suction system, or both, and any other electromechanical or electromagnetic device that is employed to control operation of the robotic pool cleaner, such as a brake, solenoid, or other device.

The control unit, motors, and pumps may be powered by a power supply. The supplied power may typically be in the form of a direct current (DC) voltage. For example, an external power supply may include an alternating current (AC) to DC converter that converts an AC line voltage to a DC voltage suitable for safe operation of the robotic pool cleaner inside a pool that may be contacted by, or may be occupied by, people or animals. Alternatively or in addition, the external power supply may include one or more of a generator, solar panels, storage or other battery, or another source of electrical power. The power supply may be located outside of the pool, e.g., at a safe distance from the edge of the pool. The robotic pool cleaner may be connected to the external power supply by a power cable, which may be configured to function as the control cable. The power cable may be configured to float on the surface of the water, e.g., by attachment of individual floats may be attached to the along the length of the cable, or by encasing the cable in a buoyant external jacket.

Figure 1:
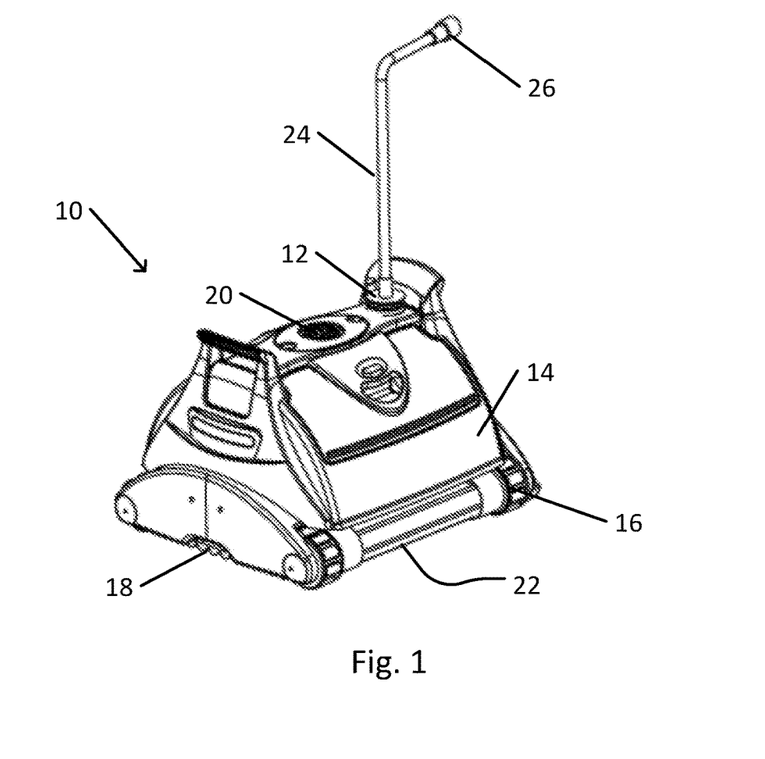
FIG. 1 schematically illustrates a robotic pool cleaner with directional control, in accordance with an embodiment of the present invention.

FIG. 1 schematically illustrates a robotic pool cleaner with directional control, in accordance with an embodiment of the present invention.

Robotic pool cleaner 10 includes a cable pull sensing mechanism 12. Cable pull sensing mechanism 12 is located where control cable 24 enters robot housing 14. Control cable 24 may be identical to a, or may include, a power cable that connects robotic pool cleaner 10 to an external power source (e.g., located outside of a pool within which robotic pool cleaner 10 is operating). In the example shown, where robotic pool cleaner 10 is oriented upright, one or more cable floats 26 may cause control cable 24 to extend vertically upward, or approximately vertically upward (e.g., the exact orientation of control cable 24 depending on any lateral forces that are exerted on control cable 24), from robotic pool cleaner 10. Cable pull sensing mechanism 12 is configured to sense a pull that is exerted on control cable 24.

Robot housing 14 may be configured to house at least one or more of a propulsion system for propelling robotic pool cleaner 10 along a pool surface, a suction system for removing debris from the pool, and a controller to control operation of various systems of robotic pool cleaner 10. Robot housing 14 may be configured to protect internal components of robotic pool cleaner 10 from potentially damaging contact with other objects or surfaces. Robot housing 14 may be configured to protect people and animals from potentially unpleasant, painful, or harmful contact with internal components (e.g., moving parts or electrical currents) of robotic pool cleaner 10. In some cases, one or more interior compartments or partitions of robot housing 14 may be watertight to protect any enclosed components (e.g., motors, circuitry or circuit boards, sensors, or other components whose operation may be interfered with by contact with a liquid) from contact with water when robotic pool cleaner 10 is submerged.

The propulsion system of robotic pool cleaner 10 may include one or more motors and transmissions for propelling robotic pool cleaner 10. In the example shown, the propulsion system may rotate one or more wheels 16. In the example shown, wheels 16 are provided with tracks 18, e.g., to increase traction between wheels 16 and a pool surface. In some examples, different wheels 16, e.g., on different or opposite sides of robotic pool cleaner 10, may be powered by different, separately controllable motors, e.g., to enable steering of robotic pool cleaner 10. In other examples, wheels 16 may be powered by single motor while transmission of torque to different wheels 16 may be separately controllable by controlling a transmission mechanism. Alternatively or in addition to wheels 16, robotic pool cleaner 10 may include other types of propulsion mechanisms (e.g., using a propeller or water jet), or other types of traction components (e.g., based on adhesion, suction, or other principles).

The suction system of robotic pool cleaner 10 may include one or more motors (which may be shared with the propulsion system, e.g., via a separate transmission, or which may be separate from those of the propulsion system) or pumps that are configured to draw in liquid from the pool through an inlet 22 (not visible in the Figures, but located on a bottom surface of robot housing 14 in the example shown) and out through outlet 20 (located on the top surface of robot housing 14 in the example shown). One or more meshes, filters, or other trapping components within robot housing 14 may separate debris from the liquid that flows from inlet 22 to outlet 20.

Figure 2:
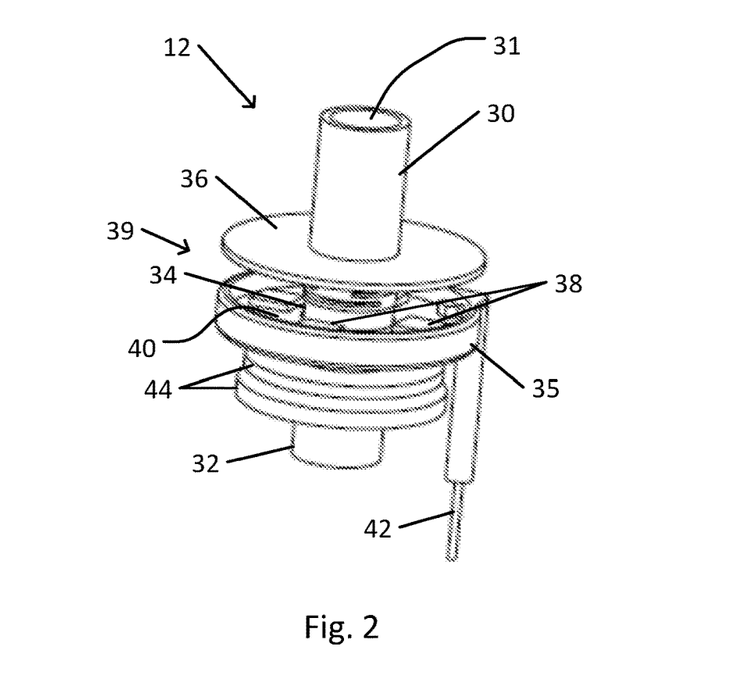
FIG. 2 schematically illustrates a perspective view of a cable sensing mechanism of the robotic pool cleaner shown in FIG. 1.
Figure 3:
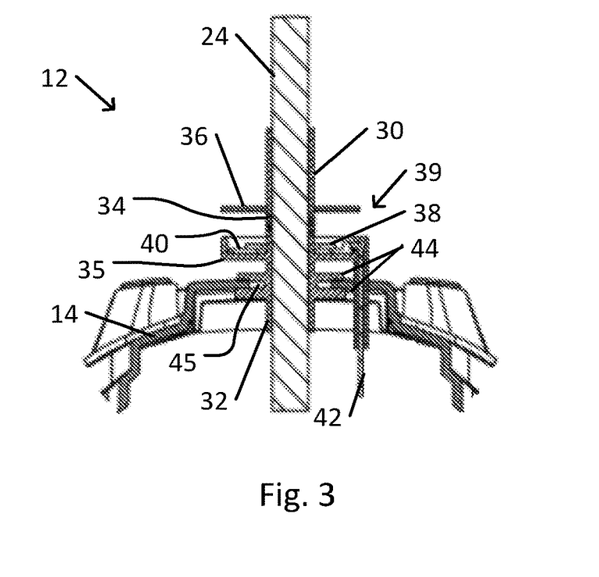
FIG. 3 schematically illustrates a cross-sectional view of a section of the robotic pool cleaner that includes the cable sensing mechanism shown in FIG. 2.

FIG. 2 schematically illustrates a perspective view of a cable sensing mechanism of the robotic pool cleaner shown in FIG. 1. FIG. 3 schematically illustrates a cross-sectional view of a section of the robotic pool cleaner that includes the cable sensing mechanism shown in FIG. 2.

Proximal sleeve 32 of cable pull sensing mechanism 12 is configured to attach rigidly to robot housing 14. In the example shown, proximal sleeve 32 is inserted into housing opening 45 on robot housing 14. A section of a wall of robot housing 14 that surrounds housing opening 45 may be sandwiched between retaining rings 44. Thus, tightening of retaining rings 44 about the wall of robot housing 14, may clamp proximal sleeve 32 to robot housing 14. For example, a hole at the center of each retaining ring 44 may include internal threading, and the outer surface of proximal sleeve 32 may include corresponding external threading. Thus, retaining rings 44 may be tightened by application of opposite torques to each of retaining rings 44 so that the threading forces retaining rings 44 against opposite sides of the wall of robot housing 14. Alternatively or in addition, proximal sleeve 32 may be integral to robot housing 14 (e.g., molded or machined as a single part), or another mechanism (e.g., clamp, latch, screw, bolt, friction, welding, gluing, or other mechanism) may be provided to fix proximal sleeve 32 to robot housing 14.

A bendable component in the form of distal sleeve 30 is connected to proximal sleeve 32 by flexible section 34. A fixed end of flexible section 34 may be attached to proximal sleeve 32 and a movable end may be attached to distal sleeve 30. For example, flexible section 34 may be constructed of an elastic material that may stretch in response to a lateral force that is exerted to its moveable end. In some cases, flexible section 34 may be provided with structure (e.g., grooves or accordion folds) to facilitate bending. As another example, flexible section 34 may be provided with elastic structure that is configured to straighten flexible section 34 when no pulling force is applied to control cable 24. Such elastic structure may include, for example, a spring that surrounds flexible section 34, a spring interior to flexible section 34 (e.g. between a wall of flexible section 34 and control cable 24), by an arrangement of springs or elastic bands about the periphery of flexible section 34, or otherwise. Elasticity or resilience of flexible section 34 may cause flexible section 34 to straighten to an unbent orientation in the absence of an applied lateral bending force. Thus, distal sleeve 30 is configured to laterally bend relative to proximal sleeve 32 when subjected to a lateral force. Since proximal sleeve 32 is rigidly attached to robot housing 14, distal sleeve is configured to laterally bend relative to robot housing 14. The elasticity of flexible section 34 may cause distal sleeve 30 to realign with proximal sleeve 32 when the lateral force is removed. In an unbent orientation in the absence of such lateral forces, distal sleeve 30 may be aligned substantially coaxially with proximal sleeve 32.

Alternatively or in addition to flexible section 34, distal sleeve 30 may be otherwise connected to proximal sleeve 32 or to robot housing 14. For example, distal sleeve 30 may be mounted on gimbals. In some cases, distal sleeve 30 may be constructed of flexible material without any additional flexible section between distal sleeve 30 and either proximal sleeve 32 or robot housing 14.

Control cable 24 is configured to attach to distal sleeve 30. In the example shown, bore 31 traverses distal sleeve 30, flexible section 34, and proximal sleeve 32 of cable pull sensing mechanism 12. Thus, control cable 24 may pass from the exterior of robot housing 14 to the interior of robot housing 14 via bore 31. For example, when control cable 24 is a power cable of robotic pool cleaner 10, control cable 24 may pass through bore 31 so as to connect to structure (e.g., to a control unit) that is internal to robot housing 14. In other examples, e.g., where control cable 24 is not required to connect to the interior of robot housing 14 (e.g., is not a power cable, or where the power cable is configured to connect to a connector or socket on distal sleeve 30, or otherwise), control cable 24 may attach otherwise to distal sleeve 30 (which, together with proximal sleeve 32, may then be a solid rod instead of a hollow sleeve).

Bending sensor 39 is configured to produce a signal that is indicative of a direction of bending of distal sleeve 30 relative to proximal sleeve 32. In some cases, the signal may also be indicative of an angle of the bending of distal sleeve 30 relative to proximal sleeve 32. The signal that is generated by bending sensor 39 may be transmitted via sensor cable 42 to an appropriate component of a control unit of robotic pool cleaner 10.

For example, bending sensor 39 may include structure, such as plate 36, that is attached to one of distal sleeve 30 and proximal sleeve 32, and an arrangement of proximity sensors 38 that are attached to the other. In the example shown, plate 36 is attached to distal sleeve 30 and proximity sensors 38 are arranged on sensor support disk 35 that is attached to proximal sleeve 32. However, in other examples, plate 36 could be attached to distal sleeve 30 and sensor support disk 35 could be attached to distal sleeve 30. In other examples, proximity sensors 38 may be configured to detect proximity of distal sleeve 30, without a plate being attached to distal sleeve 30.

Proximity sensors 38 may be connected to circuitry that is located on sensor circuit board 40. For example, sensor circuit board 40 may be mounted on sensor support disk 35 and connected to sensor cable 42. Sensor circuit board 40 may include a printed circuit board (PCB) or another type of circuit board. Each of proximity sensors 38 may be connected to sensor circuit board 40. Circuitry on sensor circuit board 40 may interact with proximity sensors 38 to produce a signal for transmission via sensor cable 42.

In the example shown, the plane of plate 36 is perpendicular to the axis of distal sleeve 30. Similarly, the plane of sensor support disk 35 is perpendicular to the axis of proximal sleeve 32. Proximity sensors 38 may be azimuthally distributed around the axis of proximal sleeve 32 on the surface of sensor support disk 35. Thus, when flexible section 34 is in an unbent orientation, and the axis of distal sleeve 30 is approximately collinear with the axis of proximal sleeve 32, all of proximity sensors 38 are approximately equidistant from plate 36. Therefore, a signal that all of proximity sensors 38 are equidistant from plate 36 may be indicative of no lateral pull being exerted on control cable 24.

On the other hand, when a lateral pull is exerted on control cable 24, distal sleeve 30 may be bent toward the direction of the exerted pull. As a result, the side of plate 36 that is closest to the direction of the pull may approach sensor support disk 35. The opposite side of plate 36 may then recede from sensor support disk 35. Thus, a proximity sensor 38 whose signal indicates closest proximity to plate 36 may indicate the direction from which control cable 24 was pulled. In some cases, signals from two proximity sensors 38 indicating closest proximity to plate 36 may be analyzed (e.g., applying a weighted average or interpolation technique) to calculate a point of closest approach of plate 36 to sensor support disk 35, and thus the direction from which control cable 24 was pulled.

For example, plate 36 may be permanently magnetized and proximity sensors 38 may be or may include magnetic field sensors, such as Hall effect sensors, that generate a signal that is indicative of local magnetic field strength. Thus, an increased sensed magnetic field by one of the magnetic field sensors is indicative of approach of plate 36 to that sensor.

For example, plate 36 may include at least one magnet, which may be in the form of an annular sheet of magnetized material. The annular sheet may be made of a flexible magnetic material, such as rubber magnetic sheet, which may be die-cut or otherwise formed to an appropriate shape. Alternatively or in addition, plate 36 or distal sleeve 30 may include individual rigid magnets.

Alternatively or in addition, proximity sensors 38 may include other types of sensors based on optical, acoustic, mechanical, electromagnetic (e.g., inductive or capacitive), thermal, or other principles that may be utilized to sense a the proximity of plate 36, or the distance of plate 36 from a proximity sensor 38. In some cases, a surface or other property of plate 36 (e.g., reflectance, magnetic susceptibility, patterning, surface texture, or another property) may be adapted to facilitate detection by a particular type of proximity sensor 38.

Proximity sensors 38 may be positioned around the periphery of proximal sleeve 32, e.g., on sensor support disk 35. Sensor circuit board 40 to which proximity sensors 38 may be mounted may be in the form an annular or half-annular printed circuit board (PCB), or an otherwise shaped PCB. Sensor circuit board 40 may be encapsulated in a material impervious to water, such as epoxy. Sensor cable 42 may connect sensor circuit board 40 to a control unit of robotic pool cleaner 10. Sensor cable 42 may carry electrical power from the control unit to proximity sensors 38, and signals from proximity sensors 38 to the control unit.

In some cases, sensor cable 42 may include separate wires that connect each proximity sensor 38 individually to the control unit. In some cases, sensor circuit board 40 may incorporate electronic circuitry to condition or preprocess the signal from proximity sensors 38, or to convert the signals to digital data. For example, each of proximity sensors 38 may be configured to output a distinguishable signal when detecting proximity (e.g., unique voltage or another characteristic). The circuitry may then combine the separate sensor signals into a single signal that is transmitted to the control unit via sensor cable 42. The control unit may then analyze the combined signal to determine which of proximity sensors 38 sensed proximity of plate 36 or of distal sleeve 30.

In some cases, proximity sensors may be mounted on plate 36 or similar structure that is mounted on distal sleeve 30, e.g., to sense proximity to a disk or plate that is mounted to proximal sleeve 32 similarly to sensor support disk 35. In some cases, some proximity sensors may be mounted on structure that is mounted to distal sleeve 30 (similar to plate 36), and others may be mounted on sensor support disk 35 (or on similar structure).

Alternatively or in addition to proximity sensors 38, bending sensor 39 may include other types of sensors to measure bending of distal sleeve 30 relative to proximal sleeve 32. For example, flexible section 34 may be provided with sensors (e.g., mechanical or optical strain sensors) that measure stretching or compression of the surface of flexible section 34. A plurality of such sensors may be azimuthally distributed on the perimeter of flexible section 34. Alternatively or in addition, distal sleeve 30 may incorporate an angular position sensor, such as a two- or three-axis accelerometer, a tilt sensor, or other sensor configured to generate a signal indicative of an angle and direction of tilt.

Figure 4:
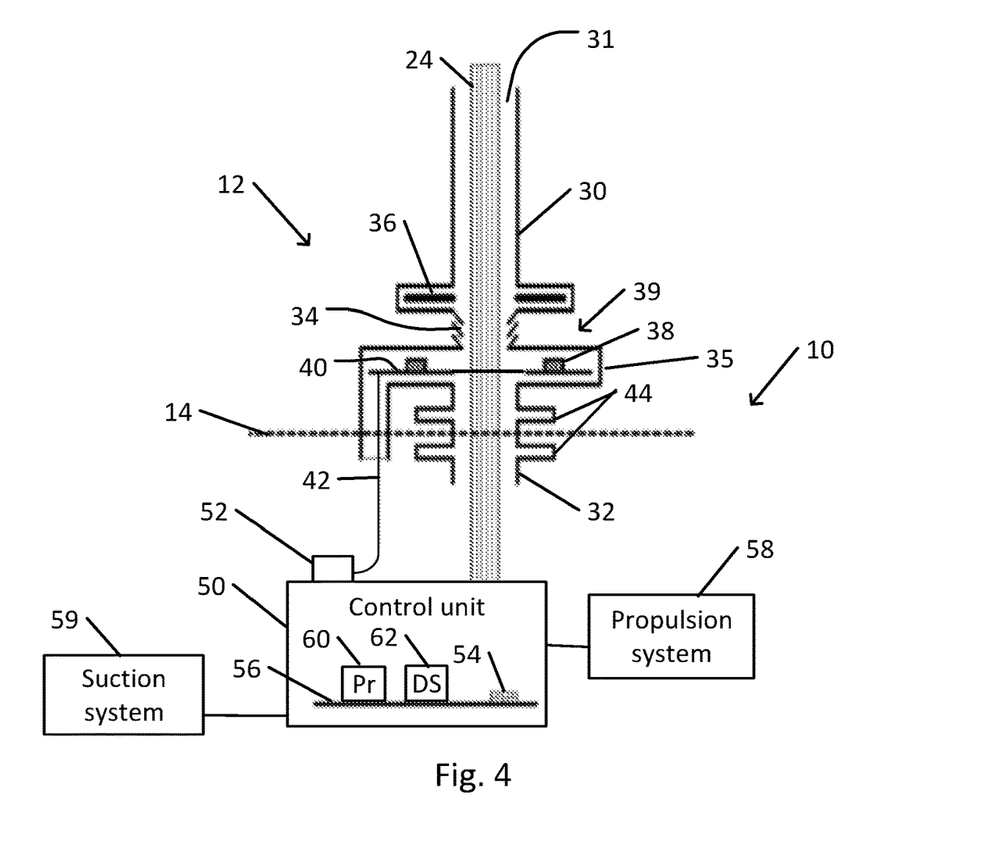
FIG. 4 schematically illustrates components for direction control of the robotic pool cleaner shown in FIG. 1.

FIG. 4 schematically illustrates components for direction control of the robotic pool cleaner shown in FIG. 1.

Control unit 50 may be configured to control one or both of propulsion system 58 and suction system 59. For example, control unit 50 may include a processor 60 and data storage unit 62. Processor 60 may include one or more processing units. Processor 60 may communicate with data storage unit 62. Data storage unit 62 may include one or volatile or nonvolatile, fixed or removable, memory or data storage devices. Data storage unit 62 may be utilized to store, for example, programmed instructions for operation of processor 60, data or parameters for use by processor 60 during operation, or results of operation of processor 60.

Control unit 50 may be configured to operate one or more motors, pumps, transmissions, or other components of one or both of propulsion system 58 and suction system 59. For example, processor 60 may be configured to operate in accordance with programmed instructions and parameters that are stored in data storage unit 62. Components of control unit 50 may be mounted on, or connected to, one or more controller circuit boards 56.

In the example shown, a power cable functions as, or is incorporated into, control cable 24. Control cable 24 passes through bore 31 of cable pull sensing mechanism 12 to connect to control unit 50. For example, the power cable may be configured to enable transmission of electrical power (e.g., DC electrical power at a voltage that is low enough so as to ensure that any failure of electrical insulation does not present any risk of injury to any people or animals that are in the pool in the vicinity of robotic pool cleaner 10). In the case where control cable 24 does not include the power cable, control unit 50 may be otherwise connected to a power source. For example, the power source may include a storage battery that is housed within robot housing 14.

Sensor cable 42 may connect to control unit 50 at sensor cable connection 52. Thus, sensor cable 42 may conduct a control cable signal from bending sensor 39 of cable pull sensing mechanism 12 to processor 60 of control unit 50. Processor 60 may be configured to process the control cable signal so as to determine if control cable 24 was pulled, and in which direction control cable 24 was pulled. In some cases, processor 60 may be configured to calculate an indication of a pulling force that was exerted on control cable 24.

Control unit 50 may include, or may be in communication with, motion sensor 54. Motion sensor 54 may include one or more sensors (e.g., at a single location on robotic pool cleaner 10 or at two more locations on robotic pool cleaner 10) that are configured to sense one or more conditions that are indicative of motion by, or of a current location or orientation of, robotic pool cleaner 10. For example, motion sensor 54 may include a tilt sensor, accelerometer, gyroscope, compass, encoder (e.g., for measuring rotation of one or more wheels 16, motor shaft, transmission gear, or of another rotating component of robotic pool cleaner 10), optical motion sensor, rangefinder, proximity sensor, pressure sensor, contact or force sensor, or another sensor that may be operated to generate a signal that is related to a quantity that may be indicative of motion of robotic pool cleaner 10 or a current location of robotic pool cleaner 10.

Control unit 50 may be configured, e.g., by programmed instructions, circuitry, or otherwise, to control one or more motors, pumps, or other components of propulsion system 58 and suction system 59 so as to guide the movement of robotic pool cleaner 10 to cover the entire surface of the pool in an efficient manner For example, control unit 50 may be configured to change a rate of suction in accordance with a current position, orientation, or both of robotic pool cleaner 10, e.g., as sensed by motion sensor 54. Control unit 50 may be configured to change a direction of travel by reversing a direction of rotation of a motor, by actuating a gear, or by otherwise steering robotic pool cleaner 10 by controlling the speed or direction of a motor, pump, transmission gear, orientation of a wheel 16, or otherwise.

For example, a signal generated by motion sensor 54 may indicate one or more of contact with or proximity to a wall of the pool, an orientation of robotic pool cleaner 10 relative to the floor of the pool, a rate of rotation or absolute orientation of robotic pool cleaner 10. Control unit 50 may control robotic pool cleaner 10 to cease movement or cleaning operation after a pre-determined period of time (referred to as a cleaning cycle), or when a predefined abnormal condition is detected (e.g., such as clogging of a filter, motion of robotic pool cleaner 10 being obstructed or prevented by contact with an obstacle, or another abnormal condition).

Control unit 50 may receive a signal from bending sensor 39 that indicates bending of distal sleeve 30 relative to proximal sleeve 32 (or to robot housing 14). Control unit 50 may then generate one or more commands to alter the current operation (e.g., speed or direction of rotation) of one or more motors of propulsion system 58 or of suction system 59. The commands may be configured to cause robotic pool cleaner 10 to move in the direction of the bend, e.g., toward a direction from which control cable 24 is being pulled.

In some cases, control unit 50 may be configured to change a direction of travel of robotic pool cleaner 10 only if a measured bending angle of distal sleeve 50 relative to an unbent orientation of distal sleeve 50 (e.g., the vertical when robotic pool cleaner is standing upright) exceeds a threshold bending angle. In some cases, the threshold bending angle may be close to zero (e.g., any detectable bending). In other cases, the threshold bending angle may have a nonzero value, such as 30°, 45°, or another nonzero angular deviation from the unbent orientation.

For example, if the signal indicates bending in a direction that is opposite the current travel direction of robotic pool cleaner 10, control unit 50 may generate commands to reverse direction of travel of robotic pool cleaner 10. Such commands may, for example, cause rotation of a drive motor of propulsion system 58 to stop, and then to begin rotating in a reverse direction.

If the signal indicates bending in a direction that is perpendicular or at another oblique angle to the current direction of travel, control unit 50 may generate commands to steer the robot towards the direction of the bending detected by bending sensor 39. For example, control unit 50 may cause wheels 16 on opposite sides of robotic pool cleaner 10 to rotate at different speeds so as to cause robotic pool cleaner 10 to turn toward the direction of the pull on control cable 24. When moving toward the direction of the pull, the pull on control cable 24 may become relaxed, thus enabling the elasticity of flexible section 34 to straighten distal sleeve 30.

For example, an operator of robotic pool cleaner 10 may pull control cable 24 to cause robotic pool cleaner 10 to reach a part of pool that it was not otherwise reaching (e.g., due to a narrowing of a section of the pool that interferes with autonomous operation of robotic pool cleaner 10) or that requires immediate attention, or to enable the operator to access robotic pool cleaner 10 (e.g., for maintenance, for removal from the pool, or for another purpose).

As another example, pulling of control cable 24 may result from control cable 24 (e.g., a power cable of robotic pool cleaner 10) becoming snagged so as to impede travel of robotic pool cleaner 10. As a result of an effort to travel away from the point of the snag (e.g., directly away from the snag or in a path at an oblique angle to a path directly away from the snag), snagged control cable 24 may be pulled by the snag. In this case, the resulting reverse travel of robotic pool cleaner 10 may approach the obstruction (e.g., directly toward the obstruction or along a path that nears but does not intercept the obstruction) may clear the obstruction or may cause control cable 24 to disentangle from the obstruction.

Control unit 50 may be configured to switch robotic pool cleaner 10 to a standby mode after a cleaning cycle is completed. When in the standby mode, propulsion system 58 may be controlled such that robotic pool cleaner 10 stands stationary, e.g., on a floor of the pool. The standby mode may further include cessation of operation of one or more components of suction system 59. For example, a cleaning cycle may be considered to be complete after robotic pool cleaner 10 has been operating autonomously for a predetermined period of time. As another example, a cleaning cycle may be considered to be complete after robotic pool cleaner 10 has cleaned a predetermined area or portion of a pool. In this example, robotic pool cleaner 10 may operate autonomously while motion sensor 54 monitors travel of robotic pool cleaner 10. Thus, the cleaning cycle may be considered to be complete after robotic pool cleaner 10 has traveled over a predefined fraction (which may include all) of, the pool surfaces.

Control unit 50 may be configured such that if control cable 24 is pulled when robotic pool cleaner 10 is standing stationary, e.g., in a standby mode, robotic pool cleaner 10 may exit from the standby mode and begin to travel, e.g., in the direction of the pull.

In some cases, control unit 50 of robotic pool cleaner 10 may be configured to exit from the standby mode and to begin traveling in response to any motion of robotic pool cleaner 10 (e.g., whether or not resulting from a pull on control cable 24) that is detected, e.g., by motion sensor 54.

Upon exiting from the standby mode, robotic pool cleaner 10 may be configured to travel to a wall at the edge of the pool. In some cases, robotic pool cleaner 10 may be configured to travel to the wall in the direction of the pull or of the detected motion. For example, traveling to the wall may facilitate retrieval or access robotic pool cleaner 10 by an operator of robotic pool cleaner 10. Arrival at the wall may be detected by one or more sensors, e.g., of motion sensor 54. For example, arrival at the wall may be sensed by a contact sensor, a proximity sensor, an inertial sensor, or a combination of two or more of these sensors or other sensors.

In some cases, robotic pool cleaner 10 may be configured to continue to travel up the wall to the waterline and to remain there, e.g., by combined operation of propulsion system 58 and suction system 59, in order to further facilitate retrieval or access.

Control unit 50 may operate in accordance with instructions stored in data storage unit 62 to control operation of robotic pool cleaner 10.

Figure 5:
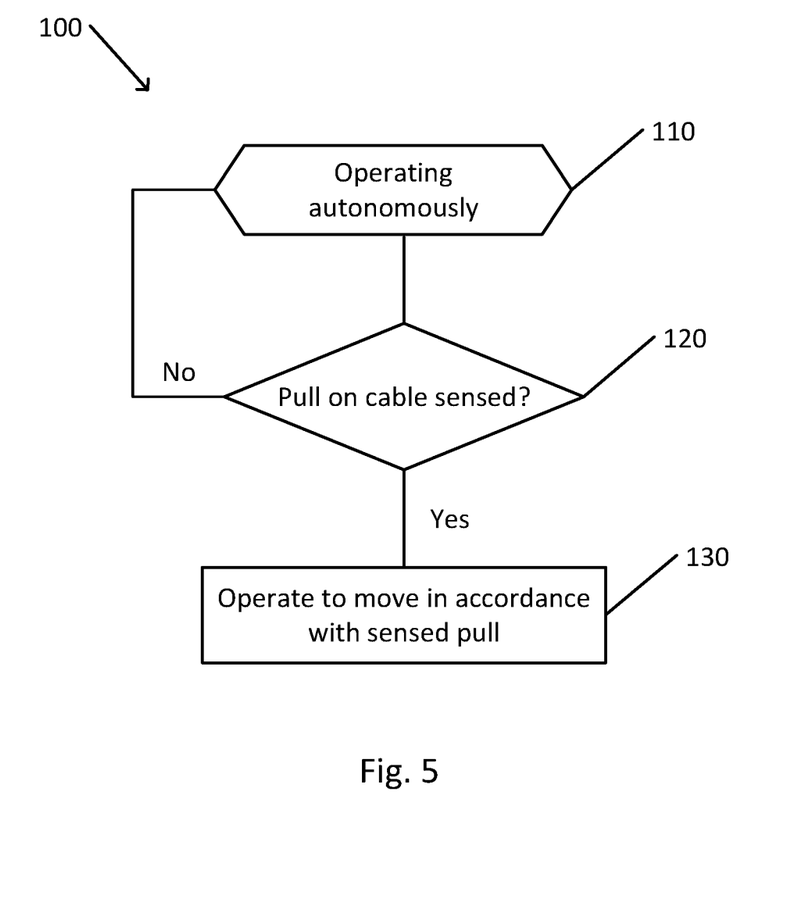
FIG. 5 is a flowchart depicting a method for directional control of a robotic pool cleaner, in accordance with an embodiment of the present invention.

FIG. 5 is a flowchart depicting a method for directional control of a robotic pool cleaner, in accordance with an embodiment of the present invention.

It should be understood, with respect to any flowchart referenced herein, that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Directional control method 100 may be executed by control unit 50, e.g., processor 60 of control unit 50, of robotic pool cleaner 10. For example, directional control method 100 may be operated continuously while robotic pool cleaner 10 is powered on or connected to a power supply.

Directional control method 100 may be executed when robotic pool cleaner 10 is operating autonomously (block 110). For example, robotic pool cleaner 10 may be traveling in a pool to clean the pool, or may be standing stationary in a standby mode.

If no pull on control cable 24 is sensed (block 120), robotic pool cleaner 10 may continue to operate autonomously (block 110).

In some cases, a pull on control cable 24 may be sensed by cable pull sensing mechanism 12 (block 120). For example, a bend of a bendable component, such as distal sleeve 30, or of another bendable component may be sensed.

In another example, an inertial sensor or a motion detector may detect a deviation from the autonomously controlled movement that could be indicative of pulling on control cable 24, or of another pulling or pushing force that is applied to robotic pool cleaner 10.

A signal that is generated by cable pull sensing mechanism 12 may indicate a direction of the pull. For example, the pull may have been exerted by an operator pulling on control cable 24, or the pull may be exerted by an obstacle on which control cable 24 has snagged.

When the pull is detected, control unit 50 may operate propulsion system 58, suction system 59, or both, to change the motion of travel of robotic pool cleaner 10 (block 130). After the change in the motion, robotic pool cleaner 10 may continue to operate autonomously (block 110) until another pull is sensed.

For example, as a result of the pull, control unit 50 may operate robotic pool cleaner 10 to change from a current direction of travel or stationary standby mode toward the direction in which control cable 24 was pulled.

In some cases, a robotic pool cleaner may be modified or retrofitted to enable directional control. For example, programming of a control unit 50 may be modified, e.g., by wired or wireless communication with an external computer or other device, or by replacement of one or more hardware components of control unit 50, such as data storage unit 62, processor 60, controller circuit board 56, or another component. A gasket where a power cable enters robot housing 14 may be replaced with cable pull sensing mechanism 12.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A robotic pool cleaner comprising:
   a housing;
   a propulsion mechanism configured to propel the robotic pool cleaner along an interior surface of a pool;
   a suction mechanism to draw liquid from the pool into the housing;
   a cable that extends outward from the housing;
   a pull sensor configured to generate a signal indicative of at least a direction in which the cable is pulled; and
   a controller configured to receive the signal and to operate the propulsion mechanism to propel the robot in accordance with the received signal.

2. The robotic pool cleaner of claim 1, wherein the pull sensor comprises a bendable component to which the cable is attached and a bending sensor, wherein the generated signal is indicative of bending of the bendable component relative to the housing.

3. The robotic pool cleaner of claim 2, wherein the bendable component comprises a sleeve through which the cable is configured to pass from outside of the housing to an interior of the housing.

4. The robotic pool cleaner of claim 2, wherein the pull sensor comprises a proximity sensor for sensing proximity of a side of the bendable component to the housing.

5. The robotic pool cleaner of claim 4, wherein the proximity sensor comprises at least one magnetic sensor that is configured to measure a magnetic field that is indicative of proximity of one or a plurality of magnets to the sensor.

6. The robotic pool cleaner of claim 5, wherein said one or a plurality of magnets are mounted on the bendable component, and said one or a plurality of magnetic sensors are mounted to the housing.

7. The robotic pool cleaner of claim 2, wherein the controller is configured to operate the propulsion mechanism to propel the robotic pool cleaner toward the direction from which cable was pulled if the bendable component is bent from an unbent orientation by an angle that exceeds a threshold bending angle.

8. The robotic pool cleaner of claim 1, wherein the pull sensor comprises an accelerometer.

9. The robotic pool cleaner of claim 1, wherein the pull sensor comprises a tilt sensor.

10. The robotic pool cleaner of claim 1, wherein the controller is configured to operate the propulsion to propel the robotic pool cleaner toward the direction from which cable is pulled.

11. The robotic pool cleaner of claim 10, wherein the controller is configured to operate the propulsion mechanism to reverse a direction of travel of the robotic pool cleaner when the direction from which the cable is pulled is substantially opposite a current direction of travel of the robotic pool cleaner.

12. The robotic pool cleaner of claim 1, wherein the pull sensor comprises a motion sensor configured to detect a deviation from a predetermined motion of the robotic pool cleaner.

13. The robotic pool cleaner of claim 1, wherein the controller is configured to cause the robotic pool cleaner to begin traveling when the signal is received from the pull sensor when the robotic pool cleaner is standing stationary in a standby mode.

14. The robotic pool cleaner of claim 13, wherein the traveling comprises traveling to a wall of the pool.

15. The robotic pool cleaner of claim 14, wherein the traveling further comprises traveling up the wall to a waterline.

16. The robotic pool cleaner of claim 15, wherein the controller is further configured to control the propulsion mechanism and the suction mechanism to cause the robotic pool cleaner to remain at the waterline after traveling up the wall to the waterline.

17. The robotic pool cleaner of claim 1, wherein the cable comprises a power cable.

18. The robotic pool cleaner of claim 1, wherein the cable includes a float.

* * * * *